H. S. A. RYDBERG.
MEMBRANE.
APPLICATION FILED AUG. 11, 1921.
1,411,187.
Patented Mar. 28, 1922.
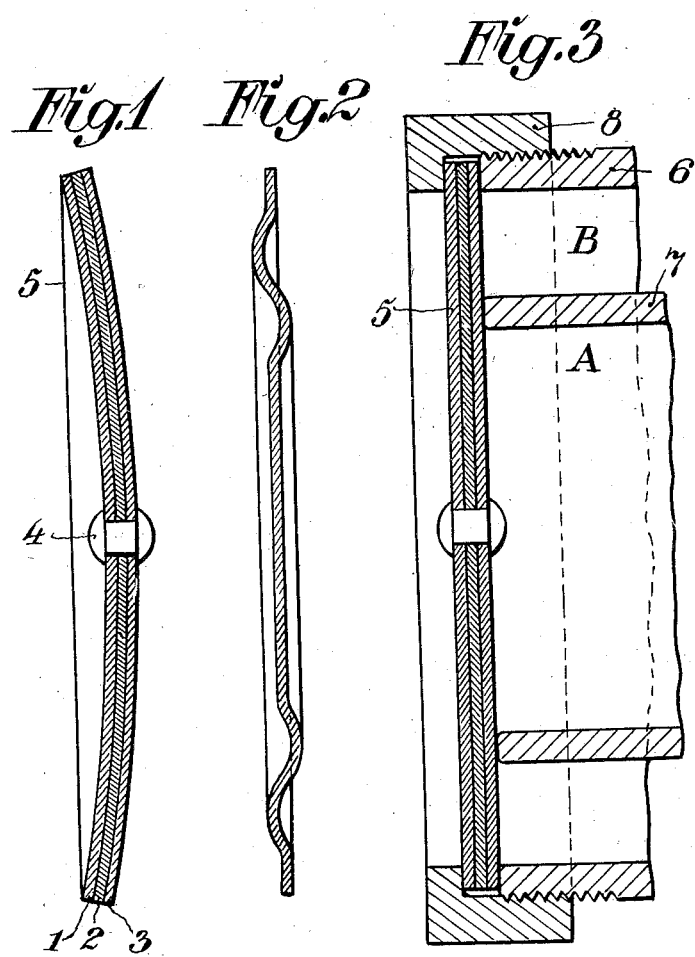
INVENTOR.
H.S.A. Rydberg.

UNITED STATES PATENT OFFICE.

HELGE SVEN ALBERT RYDBERG, OF MALMÖ, SWEDEN.

MEMBRANE.

1,411,187.  Specification of Letters Patent.  Patented Mar. 28, 1922.

Application filed August 11, 1921. Serial No. 491,622.

*To all whom it may concern:*

Be it known that I, HELGE SVEN ALBERT RYDBERG, a citizen of Sweden, residing at Malmö, Sweden, have invented certain new and useful Improvements in Membranes, of which the following is a specification, reference being had to the accompanying drawing.

The present invention relates to an improvement in such membranes or disks which influenced by a pressure medium are forced to perform elastic vibrations perpendicularly to their main plane.

With reference to the accompanying drawing Figs. 1 and 2 represent different forms of membranes according to the invention. Fig. 3 shows the outer portion of an apparatus provided with a membrane 5. This membrane 5 rests against the edges of the annular members 6 and 7 and is pressed against them by means of the ring 8 that is screwed on the member 6.

The member 7 may for instance form the wall of a chamber A in which a pressure medium acts, the chamber B between the members 6 and 7 forming an outlet for this pressure medium. Thus the pressure medium acts upon the central part of the membrane 5 and forces the same to bend outwards, whereat a part of the pressure medium passes over the edge of the member 7 out through the outlet chamber B. By this bending outwards an inner tension is effected in the membrane, and as the pressure simultaneously will be reduced in the part of the inlet chamber nearest to the membrane, the latter is carried back to its orginal position in such a way that it will rest again against the edge of the inlet chamber. As now the same conditions as from the beginning are at hand again the movement of the membrane is repeated and thus a regular oscillating movement of the membrane is obtained influenced by a pressure medium in the chamber A.

For effectuating this progress of oscillations, however, certain acoustic conditions are also required which it is not necessary here to describe for a clear understanding of the invention.

The same oscillating conditions as the ones described above are obtained, if the inlet chamber consists of the space B between the members 6 and 7 and the outlet chamber of the space above indicated by A. Similar conditions are also obtained, if the orifice of the inlet and outlet chamber has the form of an annular port, if it has one or more orifices or if it has any other similar form.

One and the same membrane must work quite satisfactorily also for pressures substantially differing from the average pressure of the driving medium. If this for instance is supposed to be 10 kg. per square centimeter the membrane must be able to be used between about 7 and 12 kg. per square centimeter in order to be in safe working order for practical use.

The membrane must be so constructed that the period of vibration determined by the dimensions of the apparatus may be forced upon the same, and therefore the membrane is not allowed to give its own period of natural vibration in such cases when this differs from the desired frequency.

As to the method of working of the apparatus it may be simply considered as a converter by which a continuous current of a driving medium is transformed into a pulsating current.

In order to attain the highest efficiency in practical use it is also necessary that the membrane at each vibration strike the orifice of the inlet pipe and fully close the same.

Further it is necessary in order to attain the highest efficiency of an apparatus that the greatest amplitudes of the swinging membrane are obtained.

If these conditions are fulfilled a nearly complete transformation from continuous to pulsating current is obtained by the greatest possible quantity of driving medium in relation to the size of the apparatus used.

All these conditions for an effective working of the apparatus are fulfilled by the present invention.

If the membrane as hitherto has been the case, consists of a simple plane disk and the driving medium acts on its central part as shown in Fig. 3, the power forcing the membrane to bend outwards, i. e. the outwards directed power in the moment when the membrane rests against the orifice of the inlet pipe, consists of the static pressure of the driving medium. During the rest of the time of vibration the inlet and outlet communicate with each other and then also a current pressure acts on the membrane at first pressing outwards and thereafter checking on its movement inwards towards the inlet. The power forcing the membrane back into its original position, i. e. the power acting inwards, depends exclusively on the elastic tension arising at the bending. If such a plane disk is used it must have such a thickness that its tension when bent outwards and thereby its inwards directed force surpasses the sum of the forces directed outwards, i. e. the static and dynamic pressure of the driving medium.

In practice it has been proved that the thickness of the membrane at commonly used working pressures must be such that thereby partly the amplitude of the disk is essentially reduced and that partly the natural vibration of the disk will be so established and of so high a frequency that this natural vibration becomes domineering and prevents the formation of vibrations with desired frequency.

These disadvantages can now be eliminated by giving the free disk a permanent bending outwards which however must not be made so large that the disk passes over from a convex condition to a concave and remains concave. If such a disk or membrane is inserted with its convex side resting against the inlet pipe and is forced by fastening devices to remain in a plane or nearly plane condition, it will exert a pressure on the inlet pipe proportional to the bending that it has been subject to previously.

An elastic bent disk of this kind can be made thinner than a disk not bent for the same working pressure, and when the bending outwards or the amplitude at these vibrations is inversely proportional to the third power of the thickness, a bent and thinner disk gives partly essentially higher amplitudes during its vibration than a thicker disk that is not bent, and partly a lower and less marked natural frequency.

Further it has been proved in practice that a membrane composed of several thin disks resting tightly against each other and of nearly the same thickness has a natural frequency that is nearly equal to and usually lower than the natural frequency of one of the separate disks of which it is composed. The same advantageous qualities which are obtained in a disk by bending the same in such a way that it is given an initial tension, are obtained in a still higher degree in a membrane composed of several such bent disks.

A membrane of this kind consisting of three disks 1, 2 and 3 is shown in Fig. 1. Supposing that a single bent disk can be used for a working pressure from 3 to 5 kg. per square centimeter, a three-fold disk can be used from 9 to 15 kg. per square centimeter. At a pressure such as the last mentioned the use of a single disk is positively excluded as it in such case must be given such a thickness that it would be practically impossible to bring it in vibration in the way mentioned above.

In order to make such a manifold disk more suited to practical use and easier to manage it may be carried out in such a way that the single disks of which it consists are firmly connected with each other. This may be done in the manner shown in Fig. 1, where an ordinary rivet 4 keeps the disks provided with central holes together. The disks may also be kept together by means of a thin annular sheet folded around the edges of the disks laid on top of each other. It is evident that also other methods of connecting the disks to a mechanical unit may be used.

A manifold bent membrane has the advantage over the single plane disks hitherto used partly that the membrane by its low and indefinite natural frequency always and fully follows the frequency determined by the other dimensions of the apparatus, and partly that the amplitudes of the membranes during the state of vibration and thus the quantity of driving medium used and the working capacity of the apparatus becomes essentially greater than when a single, plane disk having the most suitable dimensions is used.

It is evident that the membrane instead of having an even bending also can be given a corrugated form or be worked in any other way, if it only is carried out in such a way that the membrane exerts a pressure on the edge of the inlet chamber when it is fastened into the apparatus.

Such a corrugated membrane is shown in Fig. 2.

A membrane consisting of more than one disk according to the invention has the advantage of being still just as fit for use even if one of the disks bursts.

I claim:

1. An apparatus including a chamber for a pressure medium and a membrane resting against the edge of and normally closing said chamber, said membrane having a permanently bent normal form, and means for confining the membrane beyond the edge of the chamber to maintain said membrane in a substantially plane form to utilize the inherent elasticity of the normally bent membrane in this plane form to seal the edge of the chamber.

2. An apparatus including a chamber for a pressure medium and a membrane consisting of a plurality of independent layers resting against the edge of and normally closing said chamber, said membrane having a permanently bent normal form, and means for confining the membrane in a substantially plane form to utilize the inherent elasticity of the normally bent membrane in this plane form to seal the edge of the chamber.

3. Apparatus provided with membranes resting against the edge of the inlet chamber for a pressure medium and put into vibration by this medium, the membranes consisting of a plurality of single disks connected with each other by means of a rivet placed in the centre of the disks and having a permanently bent form.

In testimony whereof, I have signed my name to this specification in the presence of two subscribing witnesses.

HELGE SVEN ALBERT RYDBERG.

Witnesses:
 G. PETERSSON,
 PHILIP WILKENS.